June 29, 1965 J. W. GRAY 3,192,401

TRANSISTOR PULSE GENERATING CIRCUIT OF ALTERNATELY OPPOSITE POLARITIES

Filed Sept. 5, 1962

INVENTOR.
JOHN W. GRAY

BY H. S. Mackey

ATTORNEY

United States Patent Office 3,192,401 Patented June 29, 1965

3,192,401
TRANSISTOR PULSE GENERATING CIRCUIT OF ALTERNATELY OPPOSITE POLARITIES

John W. Gray, Pleasantville, N.Y., assignor to General Precision, Inc., a corporation of Delaware Filed Sept. 5, 1962, Ser. No. 221,589
8 Claims. (Cl. 307—88.5)

This invention relates generally to pulse generating circuits and particularly to a circuit for generating, in response to a cyclicly varying input signal, a series of large amplitude, short duration pulses which alternate in polarity.

Large amplitude pulses, especially a series having the same polarity, are used for various purposes such as for gating or enabling a radio frequency amplifier or oscillator tube. Perhaps less widely used are series of pulses which are alternately positive and negative in polarity. One use for such a series of pulses is in certain Doppler radar navigation systems in which radio frequency power is switched at a low rate, on the order of one or two cycles per second, from one antenna to another. The radio frequency switch may comprise a metal vane mounted in a waveguide junction and rotatable through ninety degrees by a D.C. motor, the direction of rotation of which is determined by the polarity of excitation. A high power, short duration pulse of the proper polarity applied at the proper time switches the radio frequency power quickly from one antenna to the other.

It would be possible to energize the D.C. motor from the power source through switches operated by a relay, the winding of which could be controlled by the input signal. However, such an arrangement would require the power supply to have sufficient capacity to furnish the comparatively large current drawn during actual switching and additionally, unless the arrangement of contacts were quite complicated, the motor would be energized unnecessarily during the intervals between actual switching operations.

It is a general object of the present invention to provide a circuit for generating a series of large amplitude pulses alternating in polarity in response to a low power, cyclicly varying input or trigger signal.

Another object is to provide a pulse generating circuit which draws but a small amount of current from the power supply.

Another object is to provide a circuit for generating, in response to an alternating input signal, a series of pulses alternating in polarity, the duration of each of which is short compared to the interval between pulses.

Briefly stated, a preferred embodiment of the invention comprises two capacitors together with circuits for charging them to opposite potentials with respect to a common junction to which one plate of each is connected. Two transistors are connected so that each provides, when conductive, a discharge path for one of the capacitors from that plate which is remote from the common junction through the load to the common junction. The transistors are rendered conductive alternately for one half cycle by a square wave input signal. As a result, each capacitor is charged during one half cycle and discharged at the beginning of the next half cycle.

For a clearer understanding of the invention, reference may be made to the following detailed description and the accompanying drawing in which.

Figure 1:
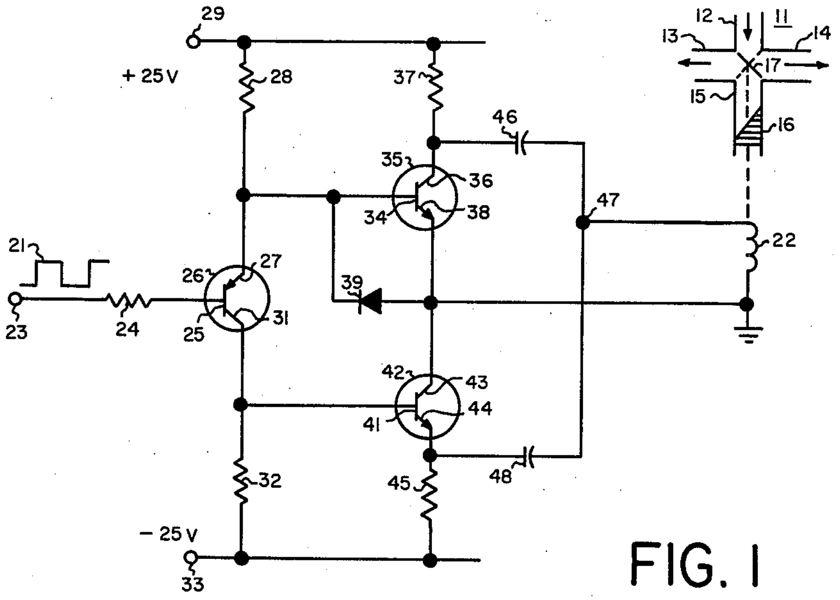
FIGURE 1 is a schematic diagram of a preferred embodiment of the invention.

Referring first to FIGURE 1, there is shown schematically a waveguide junction 11 comprising arms 12, 13, 14 and 15 which may be a part of a Doppler radar navigation system. The arm 12 may be connected to a source (not shown) of radio frequency power, the arms 13 and 14 may each be connected to an antenna (not shown) while the arm 15 may be terminated in an absorptive load 16. A vane 17 is pivotally mounted in the junction 11 and directs power entering via the arm 12 to the arm 14 when in the position shown in full outline but may be rotated through ninety degrees to the position shown by the dotted outline so as to direct power from the arm 12 to the arm 13.

One navigation system is designed to have power switched between antennas at a rate of approximately one cycle per second as determined by a square wave 21 generated for timing and controlling the switching operation. When the wave 21 is positive power should flow to one arm while when negative it should flow to the other. It is desirable that the actual switching operation be quick so that the respective antennas are energized as large a proportion of the time as possible. The vane 17 is actually moved by an electric motor, shown schematically by a winding 22, which, when energized by direct current of one polarity drives the vane 17 to one limiting position and when energized by direct current of the opposite polarity drives the vane 17 through ninety degrees to its other limiting position. The motor 22 and the vane 17 are preferably retained in their limiting positions in the absence of motor energization by a suitable mechanical or magnetic detent arrangement. The present invention is concerned primarily with apparatus for generating, under control of the square wave 21, suitable pulses for energizing the motor winding 22.

The square wave 21 is applied to an input terminal 23 which is connected through a resistor 24 to the base 25 of a PNP transistor 26, the emitter 27 of which is connected through a resistor 28 to a source 29 of positive potential while the collector 31 is connected through a resistor 32 to a source 33 of negative potential. The emitter 27 is also connected to the base 34 of an NPN transistor 35, the collector 36 of which is connected through a resistor 37 to the positive source 29 and the emitter 38 of which is grounded. A diode 39 has its cathode connected to the base 34 and its anode grounded. The collector 31 of the transistor 26 is also connected to the base 41 of an NPN transistor 42, the collector 43 of which is grounded and the emitter 44 of which is connected through a resistor 45 to the negative source 33. A capacitor 46 has one plate connected to a junction 47 and its other plate connected to the collector 36. A capacitor 48 also has one plate connected to the junction 47 while the other plate is connected to the emitter 44. The previously mentioned motor winding 22 has one terminal connected to the junction 47 and its other terminal grounded.

*Operation*

The apparatus operates in general by rendering the transistors 35 and 42 conductive alternately. While each is nonconductive its associated capacitor is charged, while when each is rendered conductive its associated capacitor is discharged through the load (the winding 22).

Figure 2:
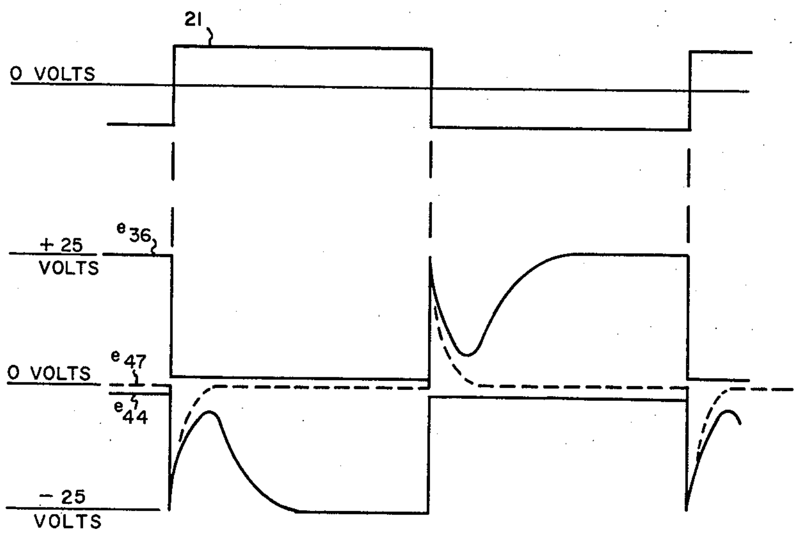
FIGURE 2 is a diagram useful in explaining the invention.

Considering the operation in more detail, assume that the input terminal 23 is negative with respect to ground and that it has been negative long enough for steady state conditions to become established. The base 25 is negative and the transistor 26 conducts. Conduction draws current through the diode 39, and the potentials of the emitter 27 and the base 34 fall slightly below ground. The transistor 35 is therefore nonconductive. The potential of the collector 36 ($e_{36}$) is substantially that of the source 29 (+25 volts). The potential of the junction 47 ($e_{47}$) is ground potential because it is connected to ground through the low resistance winding 22 through which no current is flowing at this time. Capacitor 46 is therefore charged. The base 41 of the transistor 42 is near ground potential since it is connected to the collector 31 of the transistor 26 which is conductive. Accordingly, the transistor 42 is also conductive, making the potential of emitter 44 ($e_{44}$) very near ground potential. The potentials $e_{36}$, $e_{47}$, and $e_{44}$ at this time are shown at the left of FIGURE 2, which shows the variation of these potentials throughout one cycle of the input square wave 21.

When the input wave 21 becomes positive, the base 25 becomes positive. Since the emitter 27 had been slightly negative, the transistor 26 is cut off thereby terminating the flow of current through the diode 39. As the potential of the emitter 27 and the base 34 connected thereto rises above ground, the transistor 35 becomes conductive. Current flows through the base 34, holding its potential and the potential of the emitter 27 near ground so that the transistor 26 remains nonconductive. The conduction of the transistor 35 brings the collector 36 abruptly to ground potential. At the same time, the nonconductivity of the transistor 26 cuts off the flow of current to the base 41, thereby rendering the transistor 42 nonconductive and dropping the potential of the emitter 44 to −25 volts. The combined action of (1) the fall of the potential of the collector 36 to ground while the capacitor 46 is charged and (2) the fall of the potential of the emitter 44 to −25 volts while the capacitor 48 is uncharged, causes the potential of the junction 47 to fall abruptly to −25 volts, as shown by the curve $e_{47}$ (dotted) of FIGURE 2. The capacitor 46 discharges quickly, current flowing through the low resistance of the collector-emitter circuit of the transistor 35 to ground and upward through the winding 22 to the junction 47 and the capacitor 46. The potential of the junction 47 rises to ground potential, as shown by the curve $e_{47}$ of FIGURE 2. The capacitor 48 cannot charge through the resistor 45 as fast as the capacitor 46 discharges through the transistor 35, and therefore the potential of the emitter 44 is raised toward ground. However, it does not reach ground potential but, as the capacitor 48 charges, the rise in potential is reversed, the emitter 44 eventually returning to −25 volts when the capacitor 48 becomes fully charged.

When the input square wave 21 again goes negative, the transistor 26 becomes conductive, drawing current through the diode 39 thereby making the base 34 slightly negative, cutting off the transistor 35, and raising the potential of the collector 36 to +25 volts. Conduction of the transistor 26 raises the potential of the emitter 31 and the base 41 connected thereto thereby rendering the transistor 42 conductive and raising the emitter 44 almost to ground potential. In a manner analogous to that of the previous half cycle, the combined effect of (1) the rise in potential of the emitter 44 to near ground while the capacitor 48 is charged and (2) the rise in potential of the collector 36 to +25 volts while the capacitor 46 is uncharged, causes the potential of the junction 47 to rise abruptly to +25 volts. The capacitor 48 now discharges, current flowing to the junction 47, downward through the winding 22 to ground and through the collector-emitter circuit of the transistor 42 to the capacitor 48. As the potential of the junction 47 falls to ground, the potential of the collector 36 starts to follow. However, as the capacitor 46 charges through the resistor 37, this fall of potential is reversed, the collector 36 eventually returning to +25 volts as the capacitor 46 becomes fully charged.

It is apparent that the apparatus of the invention provides a series of pulses of alternate polarity. In one embodiment, the wave 21 had a frequency of one cycle per second and the pulses were of approximately 20 milliseconds duration at a peak current of about 500 milliamperes. This current is not drawn directly from the power supply but from the capacitors. The power supply need have but a small fraction of this current capacity since each capacitor has an entire half cycle in which to be charged.

Although a specific embodiment of the invention has been described for illustrative purposes, many modifications will occur to those skilled in the art. It is therefore desired that the protection afforded by Letters Patent be limited only by the true scope of the appended claims.

What is claimed is:

1. A pulse generating circuit, comprising,
two capacitors each having first and second plates,
two circuits for charging said capacitors to opposite potentials with respect to a common junction to which said first plate of each capacitor is connected,
two transistors each having an emitter-collector circuit and base terminal,
two circuits each including one of said transistors and each providing a discharge path for one of said capacitors from said second plate through the emitter-collector circuit of the respective transistor and through a load device to said common junction,
and means coupled to the base of each of said two transistors responsive to an input signal for rendering said transistors conductive alternately.

2. Apparatus according to claim 1 in which said transistors are the same type.

3. An energization circuit comprising,
first and second capacitors each having first and second plates, said first plate of each capacitor connected to a common junction,
a first circuit coupled to said second plate of said first capacitor for charging said first capacitor to a potential which is positive with respect to said junction,
a second circuit coupled to said second plate of said second capacitor for charging said second capacitor to a potential which is negative with respect to said junction,
a two-terminal utilization device having one terminal connected to said junction,
first and second transistors, each having a base, a collector and an emitter, said second plate of said first capacitor coupled to the collector-emitter circuit of said first transistor and said second plate of said second capacitor coupled to the collector-emitter circuit of said second transistor,
and means coupled to the base of each said first and second transistors, responsive to a cyclicly varying input signal for alternately discharging said first and second capacitors through the collector-emitter circuits of said first and second transistors respectively and through said utilization device.

4. An energization circuit, comprising,
first and second capacitors each having first and second plates,
a utilization device having first and second terminals, said first terminal being connected to both of said first plates,
a first resistor connecting said second plate of said first capacitor to a source of positive potential,
a second resistor connecting said second plate of said second capacitor to a source of negative potential,
first and second transistors, each having a base, a collector and an emitter electrode,
said transistors being connected so that the collector-emitter circuit of each transistor connects one of said second plates to said second terminal, and
means, coupled to the base of each of the transistors, responsive to a cyclicly varying input signal for rendering said transistors conductive alternately.

5. A pulse generating circuit, comprising,
first and second capacitors each having first and second plates,
a load having first and second terminals,
said first terminal being connected to both of said first plates,
a first resistor connecting said second plate of said first capacitor to a source of positive potential, a second resistor connecting said second plate of said second capacitor to a source of negative potential,
first and second transistors, each having a base, a collector and an emitter,
said collector of said first transistor being connected to said second plate of said first capacitor,
said emitter of said second transistor being connected to said second plate of said second capacitor,
said emitter of said first transistor and said collector of said second transistor both being connected to said second terminal of said load,
and means, coupled to said base of each of the transistors, for rendering said transistors conductive alternately in synchronism with a cyclicly varying input signal.

6. Apparatus for passing current pulses through a load alternately in opposite directions, comprising,
first and second capacitors connected to a common junction,
a first circuit for charging said first capacitor to a potential which is positive with respect to said junction,
a second circuit for charging said second capacitor to a potential which is negative with respect to said junction,
a two terminal load having one terminal connected to said junction,
first and second transistors, each having a base, a collector and an emitter,
each of said transistors being connected with its collector-emitter circuit in a closed series circuit with said load and one of said capacitors,
a third transistor coupled to the base of both said first and second transistors,
a cyclicly varying input signal for rendering said third transistor alternately conductive and nonconductive, and
circuit means interconnecting said third transistor with said first and second transistors for rendering said first and second transistors alternately conductive and nonconductive as the conductivity of said third transistor changes, whereby said capacitors are discharged alternately through said load.

7. Apparatus according to claim 6 in which said third transistor is of complementary type with respect to said first and second transistors.

8. A pulse generating circuit, comprising,
first and second capacitors each having first and second plates,
a load having first and second terminals,
said first terminal being connected to both of said first plates,
a first resistor connecting said second plate of said first capacitor to a source of positive potential,
a second resistor connecting said second plate of said second capacitor to a source of negative potential,
first and second transistors, each having a base, a collector and an emitter,
said collector of said first transistor being connected to said second plate of said first capacitor,
said emitter of said second transistor being connected to said second plate of said second capacitor,
said emitter of said first transistor and said collector of said second transistor both being connected to said second terminal of said load,
a diode having its anode connected to said emitter of said first transistor and its cathode connected to said base of said first transistor, and
a third transistor having a base, a collector and an emitter,
said emitter of said third transistor being connected to said base of said first transistor and also through a third resistor to said source of positive potential,
said collector of said third transistor being connected to said base of said second transistor and also through a fourth resistor to said source of negative potential,
said base of said third transistor being connected to an input terminal adapted to receive a cyclicly varying input wave for rendering said third transistor alternately conductive and nonconductive,
whereby said capacitors are discharged alternately through said load.

References Cited by the Examiner

UNITED STATES PATENTS 2,546,371 3/51 Peterson ---------------- 328—57

ARTHUR GAUSS, *Primary Examiner.*